United States Patent
Jeffery, III (10) Patent No.: US 11,701,593 B2
(45) Date of Patent: Jul. 18, 2023

(54) PLAYER DEVICE PROXIMITY DETECTION FOR A LOCATION-BASED GAME

(71) Applicant: Niantic, Inc., San Francisco, CA (US)

(72) Inventor: Gordon Paul Jeffery, III, Kirkland, WA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/902,150

(22) Filed: Jun. 15, 2020

(65) Prior Publication Data

US 2021/0387098 A1    Dec. 16, 2021

(51) Int. Cl.
*A63F 13/85*    (2014.01)
*A63F 13/79*    (2014.01)
*A63F 13/327*    (2014.01)

(52) U.S. Cl.
CPC ............ *A63F 13/85* (2014.09); *A63F 13/327* (2014.09); *A63F 13/79* (2014.09); *A63F 2300/405* (2013.01); *A63F 2300/5573* (2013.01); *A63F 2300/575* (2013.01); *A63F 2300/8082* (2013.01)

(58) Field of Classification Search
CPC ...... A63F 13/216; A63F 13/327; A63F 13/65; A63F 13/69; A63F 13/79; A63F 13/85; A63F 2300/405; A63F 2300/5573; A63F 2300/575; A63F 2300/8082
See application file for complete search history.

(56) References Cited

U.S. PATENT DOCUMENTS

| | | | | |
|---|---|---|---|---|
| 10,478,729 | B1* | 11/2019 | Wells | A63F 13/35 |
| 2006/0166740 | A1 | 7/2006 | Sufuentes | |
| 2013/0005386 | A1 | 1/2013 | Kopikare et al. | |
| 2013/0005475 | A1 | 1/2013 | Mahajan et al. | |
| 2013/0275199 | A1 | 10/2013 | Proctor et al. | |
| 2014/0313862 | A1 | 10/2014 | Rahimi et al. | |
| 2017/0076330 | A1* | 3/2017 | Proctor, Jr. | G06Q 30/0266 |

FOREIGN PATENT DOCUMENTS

| | | |
|---|---|---|
| CN | 102640109 B | 11/2015 |
| CN | 108176054 A | 6/2018 |
| KR | 10-2015-0039648 A | 4/2015 |
| TW | 201116324 A | 5/2011 |
| TW | M593891 U | 4/2020 |

OTHER PUBLICATIONS

PCT International Search Report and Written Opinion, PCT Application No. PCT/IB2021/054997, dated Aug. 5, 2021, 11 pages.
Taiwan Intellectual Property Office, Office Action, Taiwanese Patent Application No. 110121626, dated Jan. 22, 2022, 30 pages.

* cited by examiner

*Primary Examiner* — James S. McClellan
*Assistant Examiner* — Ross A Williams
(74) *Attorney, Agent, or Firm* — Fenwick & West LLP (57) ABSTRACT

A client device associated with a player of a location-based game detects client devices associated with other players which are within proximity of the player device. This detection of other player client devices may result in various game actions occurring, such as an exchange of game elements between players, game progress for a player, access to a game feature, or establishing a connection between players. Detection of player devices may be performed using personal area network devices of the client devices, such as Bluetooth. Proximity detection can occur when player client devices are disconnected from an online system hosting the location-based game with the detection later being reported to the online system by one or both devices.

20 Claims, 6 Drawing Sheets

PLAYER DEVICE PROXIMITY DETECTION FOR A LOCATION-BASED GAME

TECHNICAL FIELD

The present disclosure relates generally to device proximity detection and, in particular, to detecting player devices over a local area network for use in location-based games.

BACKGROUND

Location-based games use the real world as their geography. Parallel reality games are a type of location-based game that use a virtual world that parallels the real-world geography. The parallel virtual world may span the entire real world, and players from all over the world may interact and perform various game objectives in the parallel virtual world by navigating and performing actions in the real world. Similarly-located players may play together in the same physical locations in the real world, such as by engaging in organized community game actions (e.g., live game actions associated with a particular geographic location). However, outside of planned game actions, similarly-located players may cross paths in the physical world during their daily lives without being aware of each other. For example, two players may pass each other in public space while carrying their respective mobile devices used to play a parallel-reality game. As such, players may be unaware of the player community and opportunities for dynamic interactions that they encounter.

SUMMARY

A method, system, and computer-readable storage medium are disclosed for proximity detection between client devices associated with players of a location-based game. A player client device may detect client devices associated with other players within a proximity of the player device. A proximity detection of other player client devices may result in game actions corresponding to the detection, such as an exchange of game data between players or their client devices, game progress for a player, access to a game feature, or establishing a connection between players. In embodiments, detection of player devices is performed using personal area network devices of the client devices, such as Bluetooth devices or Wi-Fi Direct devices. In the same or different embodiments, proximity detection can occur when player client devices are disconnected from an online system hosting the location-based game. In this case, the player devices can store proximity detections of other player client devices and provide information describing the detections to the online system after connecting to the online system (e.g., via the internet). The online system then performs game actions based on received information describing proximity detections.

In some embodiments, a first game item associated with a first player of the parallel reality game which is available for trade is identified. A client device associated with the first player detects a second client device associated with a second player of the parallel reality game within a proximity of the first client device. Responsive to detecting the second client device, the first client device stores an identifier of the second player. The first client device provides the identifier of the second player to an online system hosting the parallel reality game. Based on the identifier, the first client device receives updated game data indicating an exchange of the first game item for the second game item from the online system.

In some embodiments, a first player device scans a personal area network for other client devices connected to the personal area network. Based on the scanning, the first player device identifies an identifier associated with a second player device connected to the personal area network. In particular, the identifier is associated with an application on the second client device. The client device stores the identifier associated with the client device. After storing the identifier, the client device provides the identifier to an online system hosting the application. Based on the identification of the provided identifier, the first player device receives application data for processing by the application from the online system.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such elements, any one such element, or any combination of such elements. One skilled in the art will readily recognize from the following description that alternative embodiments of the structures and methods may be employed without departing from the principles described.

Exemplary Location-Based Parallel Reality Gaming System

Various embodiments are described in which player device proximity detection is performed in the context of a parallel reality game. A parallel reality game is a location-based game having a virtual world geography that parallels at least a portion of the real-world geography such that player movement and actions in the real-world affect actions in the virtual world. However, the subject matter of the present disclosure may be equally applicable to other location-based applications, such as other types of games or interactive applications.

Figure 1:
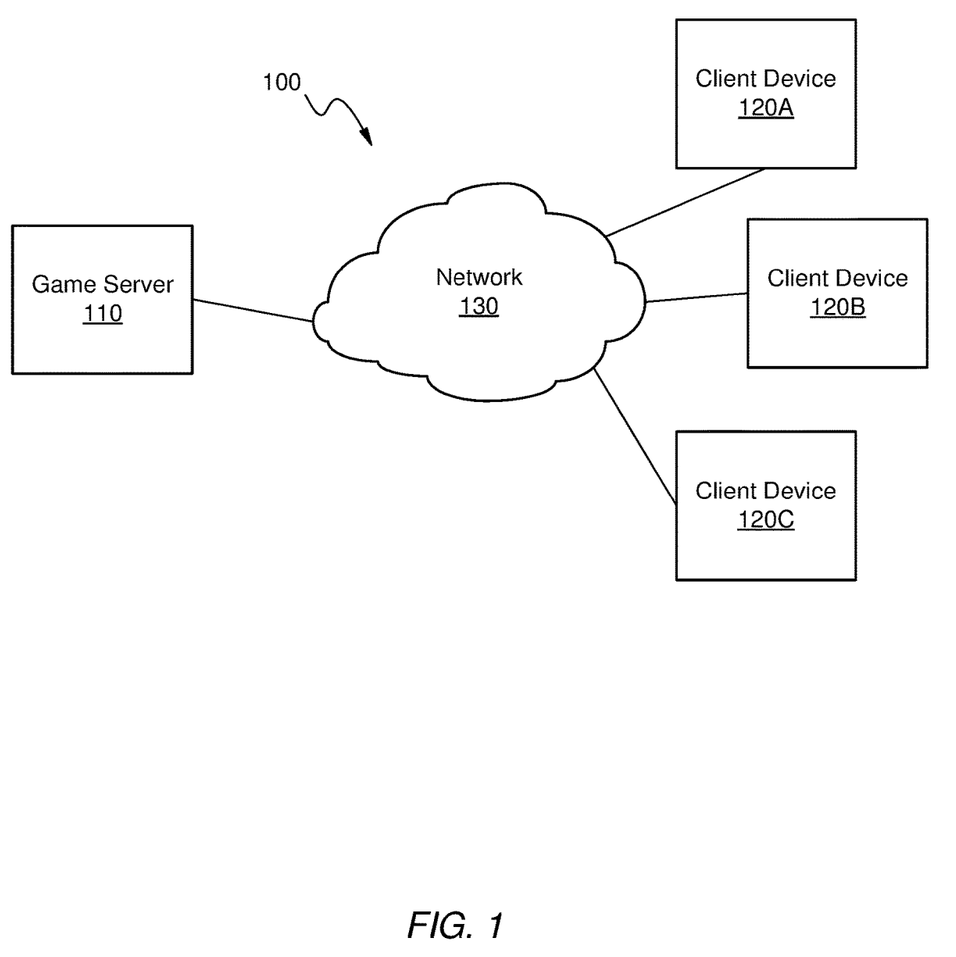
FIG. 1 is a block diagram illustrating a computing environment for a location-based gaming system, according to one embodiment.

FIG. 1 is a block diagram illustrating one embodiment of a computing environment for a location-based gaming system 100. In the embodiment shown, the location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world. For example, a coordinate system in the real world (e.g., longitude and latitude) may be mapped to a coordinate system in the virtual world (e.g., x/y coordinates, virtual longitude and latitude, etc.).

In the embodiment shown in FIG. 1, the system 100 has a client-server architecture, where a game server 110 communicates with one or more client devices 120 over a network 130. Although three client devices 120 are illustrated in FIG. 1, any number of client devices 120 can be connected to the game server 110 over the network 130. In other embodiments, the distributed location-based gaming system 100 includes different or additional elements. Furthermore, the functions may be distributed among the elements in a different manner than described.

The game server 110 hosts a master state of the location-based game and provides game status updates to players' client devices 120 (e.g., based on actions taken by other players in the game, changes in real-world conditions, changes in game state or condition, etc.). The game server 110 receives and processes input from players in the location-based game. Players may be identified by a username or player ID (e.g., a unique number or alphanumeric string) that the players' client devices 120 send to the game server 110 in conjunction with the players' inputs. In some embodiments, the game server hosts several location-based games, other types of games, or other applications.

In various embodiments, the game server 110 processes game actions based on client devices 120 detecting each other in the real world. The game server 110 receives information from a client device 120 indicating that a client device 120 (e.g., client device 120A) was in proximity to another client device (e.g., client device 120B). In particular, the information identifies one or more players associated with the relevant client devices 120, such as a player username or ID or a device ID. Proximity detection is described in greater detail below with reference to the client devices 120 and FIG. 2. The game server 110 further performs various game actions based on the information received from client devices 120 describing detections of another client device 120. Game actions based on device proximity detection and various embodiments of the game server 110 are described in greater detail below with reference to FIG. 3.

The client devices 120 are computing devices with which players can interact with the game server 110. For instance, a client device 120 can be a smartphone, portable gaming device, tablet, personal digital assistant (PDA), cellular phone, navigation system, handheld GPS system, or other such device. Although only three client devices are depicted in FIG. 1 (i.e., client device 120A, 120B, and 120C), the location-based gaming system 100 may include any number of client devices 120. A client device 120 executes software associated with the location-based game hosted by the server 110, such as a client game application, to allow a player to interact with the virtual world. A client device 120 may also include hardware, software, or both for providing a user interface for chat rooms. The client devices 120 are configured to detect other client devices 120 when the devices are in proximity to each other in the physical world (i.e., device proximity detections). In embodiments, client devices 120 perform proximity detection using a personal area network (PAN) device and associated communication protocols (e.g., Bluetooth, ZigBee, infrared, ultra-wideband, near-field communication, Wi-Fi Direct, etc.). The client device 120 may store information describing the detections of other client device 120 in the physical world (e.g., player identifiers associated with a user of the detected client device or device identifiers associated with the detected client device). The client device 120 may provide the stored information corresponding to the detections to the game server 110. Various embodiments of client device 120 are described in greater detail below, with reference to FIG. 2.

The distance range at which client devices 120 can perform proximity detections of other client devices 120 may vary depending on the technique or devices used. If the client devices 120 use a PAN device for proximity detection, as described above, the distance range for proximity detection is a range at which the particular PAN device is able to detect another PAN device. For example, in the case of Bluetooth Low Energy (LE), a Bluetooth LE device can detect or connect to other Bluetooth LE devices at a range of approximately sixty meters. As another example, in the case of Wi-Fi direct, a Wi-Fi direct device can detect or connect to other Wi-Fi direct devices at a range of approximately one hundred meters. In the same or different embodiments, the client device 120 may use other devices or techniques to perform proximity detection of other client devices 120. As an example, the client devices 120 may use geographic coordinates of client devices 120 determined using GPS receivers on the client devices 120. In this case, the distance range for proximity detection may be an established threshold distance (e.g., twenty meters). As another example, the client device 120 may connect to local area networks (LANs), such as Wi-Fi networks, and identify other devices connected to the same LAN. In this case, the distance range for proximity detection may be the range at which client devices 120 can connect to a particular LAN, which may be influenced by relevant software and hardware providing the LAN (e.g., a type of wireless LAN router used).

The network 130 can be any type of communications network, such as a local area network (e.g., intranet), wide area network (e.g., internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g., TCP/IP, HTTP, S1v1TP, FTP), encodings or formats (e.g., HTML, JSON, XML), and/or protection schemes (e.g., VPN, secure HTTP, SSL).

Figure 2:
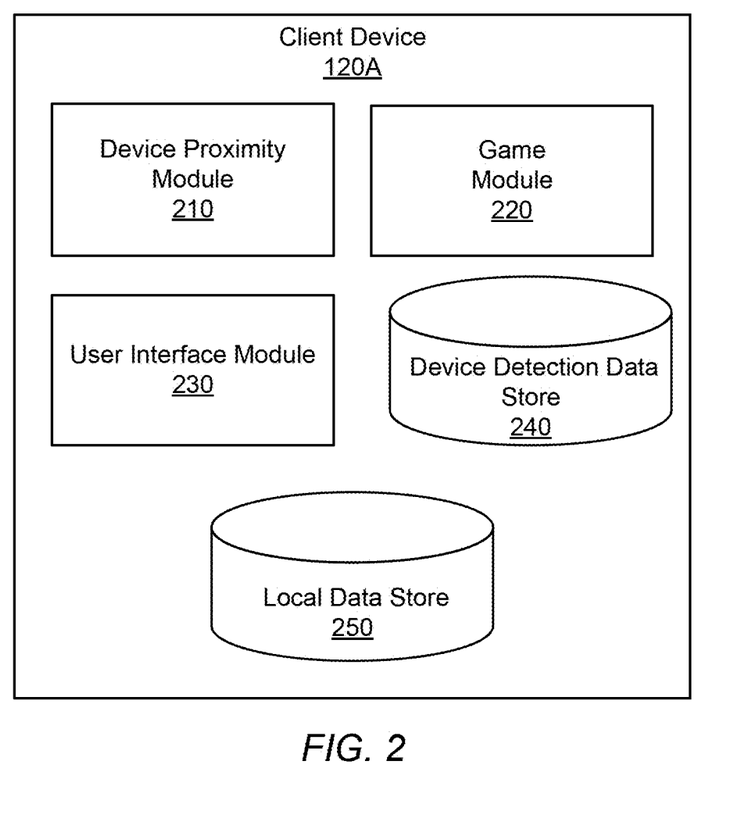
FIG. 2 is block diagram of a client device shown in FIG. 1, according to one embodiment.

FIG. 2 is block diagram of one embodiment of the client device 120A shown in FIG. 1. The client device 120A is associated with a player of the parallel-reality game. Other client devices (e.g., client devices 120B and 120C) have the same or similar architectures and are associated with other players of the parallel-reality game. Because the gaming system 100 is for a location-based game, the client devices 120 are preferably portable computing devices, such as smartphones or other portable devices, that can be easily carried or otherwise transported with a player. A player can interact with the virtual world simply by carrying or transporting their client device 120 in the actual world. In the embodiment shown, the client device 120A includes a device proximity module 210, a game module 220, a user interface module 230, a device detection data store 240, and a local data store 250. In other embodiments, the client device 120A includes additional or different components than those depicted in FIG. 2.

The device proximity module 210 detects other client devices 120 which come within proximity to the client device 120A associated with the player of the location-based game (i.e., a player device) as the player moves around with the client device 120A in the real world. In some embodiments, the device proximity module 210 includes a PAN device. In these embodiments, the PAN device broadcasts information describing the broadcasting client device 120 or a player associated with the broadcasting client device 120, such that another client device 120 within a proximity of the broadcasting client device 120 can receive the broadcast information. Furthermore, the PAN device includes a scanner which identifies information broadcast by PAN devices of other client devices 120. For example, if the PAN device is a Bluetooth LE device, the Bluetooth LE device may use one more channels to continuously broadcast an advertisement data packet including a Universally Unique Identifier (UUID) corresponding to the Bluetooth LE device and a message including an identifier of the player (e.g., a player ID or username). The Bluetooth LE device may periodically or continuously listen to the one or more channels used to broadcast the advertisement data packet, as described above.

In the same or different embodiments, after another client device 120 is detected, the device proximity module 210 stores information describing the detection in the device detection data store 240. In particular, the device proximity module 210 stores information identifying the player received by the PAN device or other contextual information, such as a timestamp indicating when the detection occurred. The device proximity module 210 provides information corresponding to device detections to the game module 220. In alternative embodiments, the device proximity module 210 provides information corresponding to device detection directly to the game server 110.

In some embodiments, the device proximity module 210 verifies that a particular device proximity detection satisfies one or more criteria before storing information describing the device proximity detection in the device detection data store 240 or providing the information to the game module 220. For example, the device proximity module 210 may verify device proximity detections based on criteria corresponding to a time of the device proximity detection, a geographic location of the device proximity detection, a player associated with the detected device, or other contextual information. In one embodiment, the device proximity module 210 verifies that a detected client device 120 or a player associated with a detected client device 120 has not been detected within a previous time interval (e.g., the previous hour, previous day, previous week, etc.). For instance, the location-based game may perform game actions based on proximity detections of the same client device 120 only once per time interval. In this way, the location-based game can prevent multiple or frequent game actions for two players whose client devices 120 are in the same physical location for a period of time or otherwise detect each other multiple times in some time interval. By verifying device proximity detections satisfy one or more criteria, the device proximity module 120 prevents duplicate storage of proximity detections which will not result in additional game actions after being provided to the game server 110. In alternative embodiments, the device proximity module 210 stores information describing all device proximity detections and the device proximity detections are instead verified based on one or more criteria as described above by the game module 220 or the game server 110.

The game module 220 operates a client-side game application for a parallel reality game hosted by the game server 110. In embodiments, the game module 220 communicates information about the virtual world with the user interface module 230, such as to display content associated with the virtual world. The game module 220 further receives or obtains game data from the game server 110. For example, the game module 220 may receive game data from the game server 110 describing available game content based on the location of a client device 120 (e.g., game items), the geographic locations of devices associated with other players, or upcoming community events (e.g., competitive tournaments). In the same or different embodiments, the game module 220 transmits information describing device proximity detections made by the device proximity module 210, or stored in the device detection data store 240, to the game server 110. In this case, the game module 220 receives or obtains game data from the game server 110 describing one or more game actions based on information describing device proximity detections provided by the game module 220 to the game server 110. Game actions based on device detections are described in greater detail below with reference to FIG. 3.

In some embodiments, the game module 220 transmits information describing device detections to the game sever 210 based on the occurrence of certain events. For example, if the game module 220 is disconnected from the game server 110 (e.g., when a client device 120 is not connected to the internet), the device proximity module 210 may store information describing any device detections which occurred during a time period when the game module 220 was disconnected. In this case, after the game module 220 reconnects to the game server 110 (e.g., over the network 130), the game module 220 may transmit some or all of the device detections which occurred during the time period. As another example, the game module 220 may transmit information describing one or more device proximity detections in response to certain user interactions with the client device 120, such as a user launching or resuming a client game application associated with a location-based game hosted by the game server 110. As still another example, the player associated with the client device 120 may manually indicate a desire to provide stored device detections through a user interaction with the client device 120. In the same or different embodiments, the game module 220 provides information describing one or more stored device detections to the game server 110 periodically, such as at a pre-defined time interval (e.g., every minute).

The user interface module 230 of the client device 120 constructs and displays components of user interfaces of the client device 120. In some embodiments, the user interface displays depictions of the virtual world to the user including components of the virtual world, such as virtual elements and virtual experiences, as received from the game module 220. The user interface module 230 may also display chat room locations in the virtual world, as well as messages sent between users in the chat rooms. A user may interact with the client device 120 to engage with virtual elements, participate in virtual experiences, or converse in chat rooms. For example, the user interface module 230 may display a view of the virtual world depicting points of interest, chat rooms, and other virtual experiences. The user of the client device 120 can interact with these components via the user interface to complete a task, join a chat room, or participate in a competition, among other actions.

In some embodiments, the user interface module 230 provides user interfaces relevant to proximity detections of one or more other client device 120. For example, the user interface module 230 may display a notification indicating that another client device 120 was detected and information relevant to the detection, such as a player ID of a player associated with the detected device or a time when the detection occurred. In the same or different embodiments, the user interface module 230 provides elements allowing a user of the client device 120 to determine what happens based on a proximity detection of other client devices. For example, the user interface module 230 may provide user interfaces including elements for adjusting proximity detection preferences (e.g., enable or disable device proximity detection), initiating a transmittal of information describing device proximity detections stored in the device detection data store 240, reviewing device proximity detections stored in the device detection data store 240, or selecting from possible game actions based on proximity detections. In particular, the user interface module 230 may provide an interface including elements for initiating proximity detection, such as a "search for other players" element (e.g., a button).

The device detection data store 240 is one or more computer-readable media configured to store information describing device proximity detections by the client device 120. The information stored by the device detection data store 240 may be received from the client device 120 or otherwise obtained or determined by the game server 110. In embodiments, the device detection data store 240 stores at least an identifier of a player associated with a device detected based on a device proximity detection. The device detection data store 240 may further store contextual information describing a device proximity detection, such as a timestamp indicating when a device proximity detection occurred or a geographic location (e.g., GPS coordinates) indicating where a device proximity detection occurred. In some embodiments where the game server 110 hosts multiple games, the device detection data store 240 stores information describing one or more games corresponding to a given device proximity detection (e.g., a game name or identifier). In still further embodiments, the device detection data store 240 stores security information preventing inaccurate or fraudulent proximity detections, a duration of time a proximity detection occurred (e.g., an amount of time another device was detected for), or other information describing players or devices relevant to a proximity detection.

The local data store 250 is one or more computer-readable media configured to store data used by the client device 120. For example, the local data store 250 may store the player location information tracked by the positioning device 210, a local copy of the current state of the parallel reality game, or any other appropriate data. Although the local data store 250 is shown as a single entity, the data may be split across multiple media. Furthermore, data may be stored elsewhere (e.g., in a distributed database) and accessed remotely via the network 130.

Figure 3:
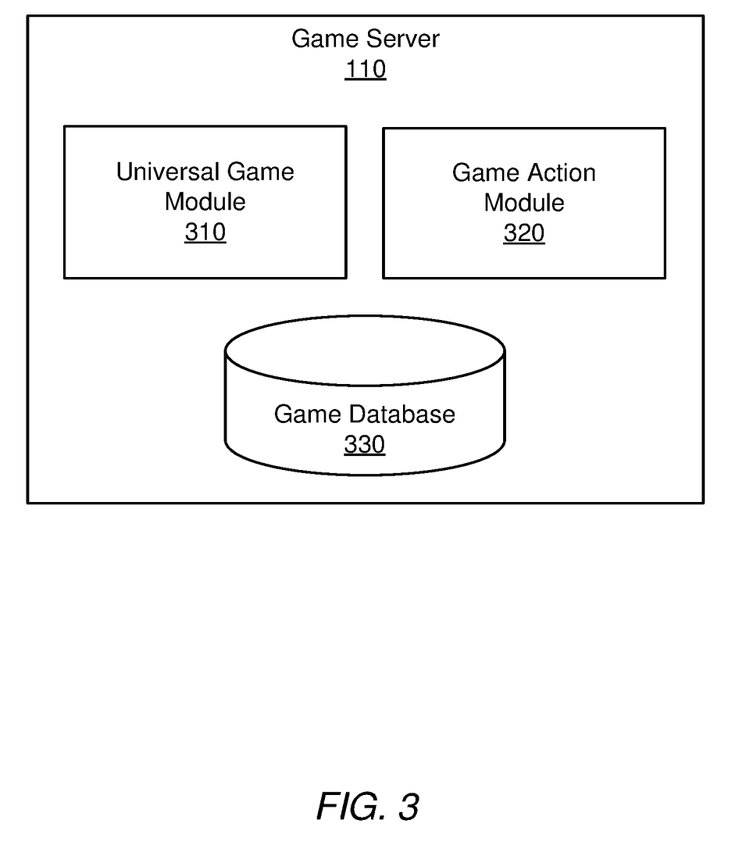
FIG. 3 is a block diagram of the game server shown in FIG. 1, according to one embodiment.

FIG. 3 illustrates one embodiment of the game server 110 hosting a location-based parallel reality game. In the embodiment shown, the game server 110 includes a universal game module 310, a game action module 320, and a game database 330. In other embodiments, the game server 110 contains different or additional elements. In addition, the functions may be distributed among the elements in a different manner than described.

The game server 110 can be configured to receive requests for game data from one or more client devices 120 (for instance, via remote procedure calls (RPCs)) and to respond to those requests via the network 130. For instance, the game server 110 can encode game data in one or more data files and provide the data files to a client device 120. In addition, the game server 110 can be configured to receive game data (e.g., player location, player actions, player input, etc.) from one or more client devices 120 via the network 130. For instance, the client device 120 can be configured to periodically send player input, player location, and other updates to the game server 110, which the game server 110 uses to update game data in the game database 330 to reflect changed conditions for the game. The game server 110 may also send game data to client devices 120, such as other player locations, chat room locations, or virtual element locations.

The universal game module 310 hosts the location-based game for players and acts as the authoritative source for the current status of the location-based game. The universal game module 310 receives game data from client devices 120 (e.g., player input, player location, player actions, player status, landmark information, etc.) and incorporates the game data received into the overall location-based game for all players of the location-based game. With the game data, the universal game module 310 stores a total game state of the game that can be sent to a client device 120 to update the local games state in the game module 220. The universal game module 310 can also manage the delivery of game data to the client devices 120 over the network 130.

The game action module 320 can be a part of or separate from the universal game module 310. The game action module 320 is configured to perform game actions based on proximity detections performed by client devices 120. The game action module 320 receives information describing proximity detections from client devices 120. Using the received proximity detection information, the game action module 320 performs game actions which create, modify, or otherwise process game data. The game action module 320 can provide game data to client devices 120 based on performed game actions, such as a client device 120 which provided the proximity detection information to the game action module 320 resulting in the game actions. For instance, the game action module 320 perform game actions which process game data corresponding to players of the location-based game (e.g., associated with a profile or account for the player), such as any combination of game data described below with reference to the game database 330 (e.g., game data of types (1)-(9)). As an example, if a client device 120 associated with player A detects another client device 120 associated with a player B, the game action module 320 may modify the player profiles of player A or player B based on a game action. In some embodiments, the game action module 320 communicates with the universal game module 310 in order to perform game actions. For example, the game action module 320 may communicate with the universal game module 310 to determine what game actions can be performed based on the received proximity detection information or other contextual information (e.g., the current time or game features). In the same or different embodiments, the game action module 320 provides information describing one or more game actions performed to a client device 120, such as information describing the processing performed on game data corresponding to one or more game actions. The information describing the one more game actions performed may include a notification for display on the client device 120, such as a notification indicating the game action occurred or describing the game action.

In various embodiments, the game action module 320 performs a game action which processes game data of one or both players corresponding to a device proximity detection. In some embodiments, the game action module 320 performs a game action for a player associated with a client device 120 which provided the information describing a proximity detection (i.e., the detecting device). For instance, if client device 120A provided information describing a device proximity detection of client device 120B, the game action module 320 could perform a game action affecting game data for a player associated with client device 120A. Such game actions may include the game action module 320 providing a game item as a reward to the player, providing game experience to the player (e.g., leveling up a game character associated with the player), recommending the player send a friend request to the other player, or other game actions specific to the player. In the same or different embodiments, the game action module 320 performs a game action which processes game data of a player associated with the detected device (e.g., client device 120B in the previous example). The game action module 320 may perform game actions for the player associated with the detected device which are the same or different as those performed on for the player associated with the detecting device. In still further same or different embodiments, the game action module 320 performs a game action which processes game data of both the player associated with the detecting device and the player associated with the detected device (e.g., both client device 120A and client device 120B in the above example). Game actions performed by the game action module 320 affecting the game data of both players may include exchanging game elements between the players (e.g., game items, images, messages, game statuses, etc.), providing game elements from one player to the other player, initiating an in-game event for both of the players (e.g., a battle), adding one player to an existing augmented reality experience in which the other player is already engaged, updating an in-game map associated with one or both of the players, or providing information describing the opposite player for establishing a connection between the players.

In some embodiments, the game action module 320 determines one or more game actions to perform based on whether the game action module 320 received information describing a device proximity detection from both client devices 120 involved in the proximity detection. For example, if the game action module receives information describing a detection of client device 120B from client device 120A, the game action module 320 may determine one or more game actions to perform based on whether information describing a detection of client device 120A from client device 120B is also received. In other embodiments, the game action module 320 determines one or more game action to perform based on device proximity detection information received from a single client device 120.

In some embodiments, a game action performed by the game action module 320 is an exchange of game items between two players of the location-based game (i.e., a game item trade). For instance, in response to receiving information describing a proximity detection between a first player and a second player, the game action module 320 can obtain one or more game items associated with the first player to trade for one or more game items associated with the second player. In one embodiment, players are able to designate one or more game items (e.g., game items associated with their player profile or account) which they desire to trade with other players. As an example, a player may select from a set of game items they have collected by playing the location-based game to be added to a group of game items which can be traded with other players when a device proximity detection occurs. This selection may be made by the player using a client device 120 associated with the player or another device (e.g., a laptop or desktop computer) which can communicate with the game server 110. The game action module 320 can then execute a trade between two players when one or both of their associated client devices 120 detects the other device in the real world, as indicated by received device proximity detection information. For example, if client device 120A detects client device 120B, the game action module 320 can exchange one or more game items for a player associated with client device 120A and a player associated game client device 120B. In exchanging the game items, the game action module 320 updates game data in the game database 330. The game action module 320 may additionally, or alternatively, communicate with the universal game module 310 to execute the game item trade or convey that the game item trade occurred. In an embodiment, the game action module 320 provides a notification for display to one or both of the client device 120 involved in a game item trade indicating the trade occurred or describing the details of the trade.

In various embodiments, the game action module 320 performs additional processing in order to execute a game item trade. In one embodiment, the game action module 320 determines or identifies values associated with game items designated for trade by players corresponding to a device proximity detection. A value for a game item may correspond to characteristics of a game item, a price for game items in a real or in-game currency, other indicators of a game item value, or some combination thereof. The game action module 320 uses the values of the game items in order to select one or more game items for each player corresponding to a device proximity detection to trade. For example, the game action module 320 may exchange game items which have the same value or values with a difference within a trade threshold. Other examples of information which the game action module 320 may consider in executing trades between players include associations between players in the location-based game (e.g., are the players friends, are they both associated with an in-game organization, such as a team, etc.), or characteristics of the game items (e.g., a game item type).

The game database 330 includes one or more machine-readable media configured to store game data used in the location-based game to be served or provided to client devices 120 over the network 130. In embodiments, the game data stored in the game database 330 can include: (1) data associated with the virtual world in the location-based game (e.g. imagery data used to render the virtual world on a display device, geographic coordinates of locations in the virtual world, etc.); (2) data associated with players of the location-based game, such as player profile or account data (e.g. player information, player experience level, player currency, player inventory, current player locations in the virtual world/real world, player energy level, player preferences, team information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player locations, past player locations, player moves, player input, player queries, player communications, etc.); (8) data associated with virtual experiences (e.g., locations of virtual experiences, players actions related to virtual experiences, virtual events such as raids, etc.); and (9) any other data used, related to, or obtained during implementation of the location-based game. The game data stored in the game database 330 can be populated either offline or in real time by system administrators or by data received from players, such as from one or more client devices 120 over the network 130.

The game database 330 may also store real-world data. The real-world data may include population density data describing the aggregate locations of individuals in the real world; player density data describing the aggregate locations of players in the real world; player actions associated with locations of cultural value or commercial value; player heat map data describing the distribution of game actions in a geographic area; point of interest data describing real-world locations that correspond to locations of virtual elements in the virtual world; terrain data describing the locations of various terrains and ecological conditions, such as large bodies of water, mountains, canyons, and more; map data providing the locations of roads, highways, and waterways; current and past locations of individual players; hazard data; weather data; event calendar data; activity data for players (e.g., distance travelled, minutes exercised, etc.); and other suitable data. The real-world data can be collected or obtained from any suitable source. For example, the game database 330 can be coupled to, include, or be part of a map database storing map information, such as one or more map databases accessed by a mapping service. As another example, the game server 110 can be coupled to one or more external data sources or services that periodically provide population data, hazard data, weather data, event calendar data, or the like.

Other modules beyond the modules shown in FIG. 3 can be used with the game server 110. Any number of modules can be programmed or otherwise configured to carry out the server-side functionality described herein. In addition, the various components on the server-side can be rearranged. Other configurations will be apparent in light of this disclosure and the present disclosure is not intended to be limited to any particular configuration.

Device Proximity Detection Methods

Figure 4:
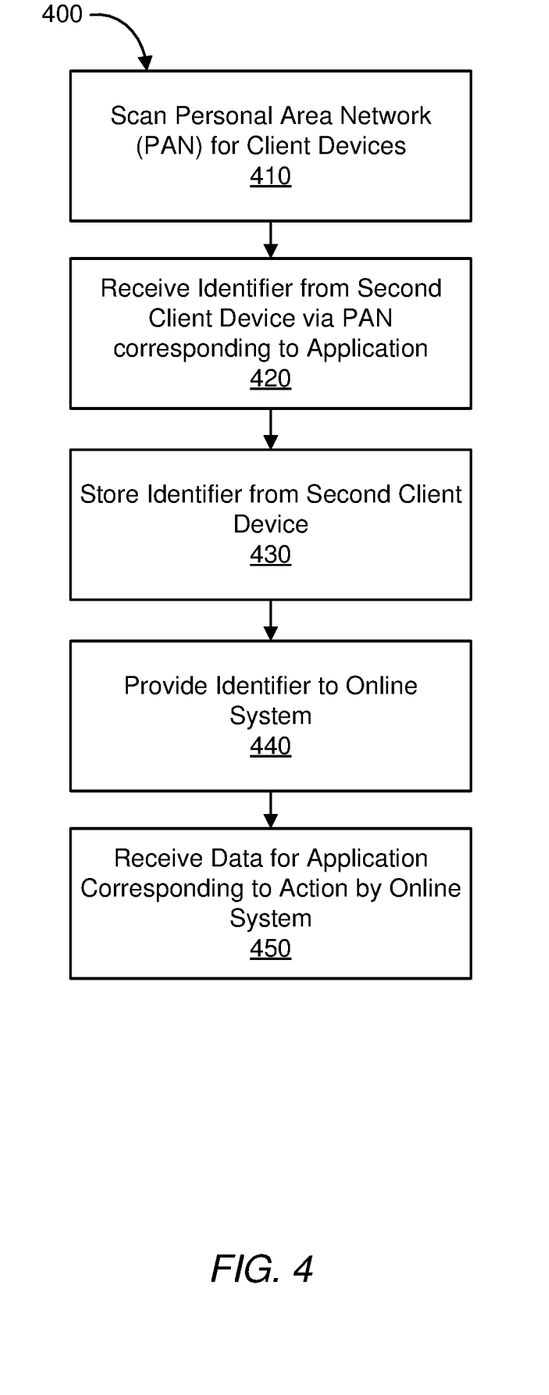
FIG. 4 is a flowchart illustrating a method for device proximity detection, according to one embodiment.

FIG. 4 is a flowchart illustrating an embodiment of a method 400 for device proximity detection. In the embodiment shown, the steps of FIG. 4 are illustrated from the perspective a client device 120 performing the method 400. However, some or all of the steps may be performed by other entities or components. In addition, some embodiments may perform different steps or perform some of the steps in a different order or in parallel.

In the embodiment shown in FIG. 4, the method 400 begins with a first client device (e.g., the client device 120A) scanning 410 a PAN for other client devices. For example, the first client device may use a scanner of a PAN device to scan for information broadcast by PAN devices of other client devices 120 in order to make device proximity detections. Based on the scanning, the first client device receives 420 an identifier from a second client device (e.g., the client device 120B) via the PAN which corresponds to an application on the second client device. For example, the first client device may perform a proximity detection of the second client device by receiving information broadcast by the second client device (e.g., using the device proximity module 210) including a player ID of a location-based game player associated with the second client device. The first client device stores 430 the identifier received from the second client device. For example, the first client device may store the identifier in the device detection data store 240.

The first client device provides 440 the identifier to an online system corresponding to the application. For example, the first client device may provide the identifier to the game server 110 (e.g., using the game module 220). The first client device receives 450 data for the application corresponding to an action performed by the online system based on the receiving of the identifier by the first client device. For example, the first client device may receive game data corresponding to a game action performed by the game server 110.

Figure 5:
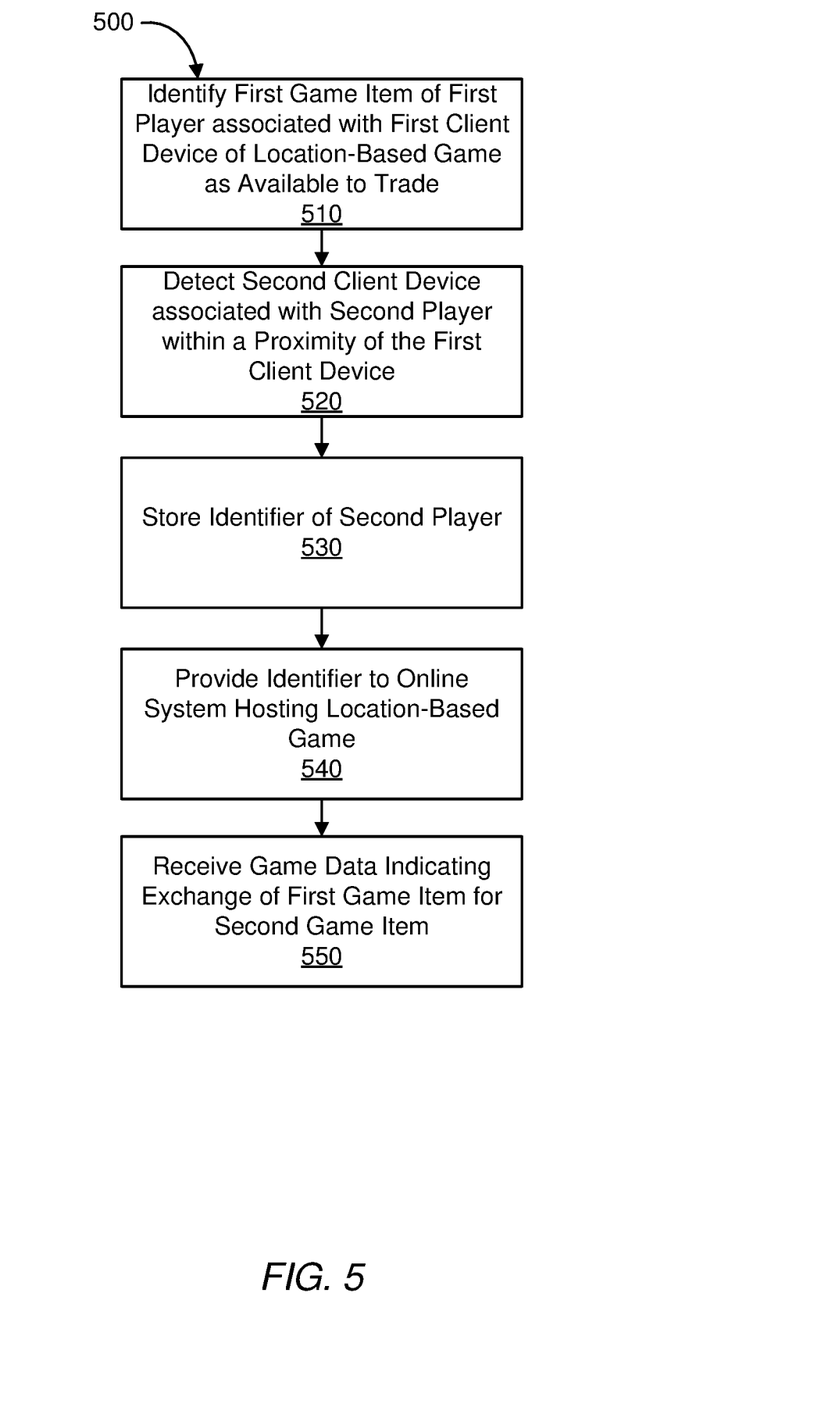
FIG. 5 is a flowchart illustrating a method 500 for trading game items using device proximity detection, according to one embodiment.

FIG. 5 is a flowchart illustrating an embodiment of a method 500 for trading game items using device proximity detection. In the embodiment shown, the steps of FIG. 5 are illustrated from the perspective of a client device 120 performing the method 500. However, some or all of the steps may be performed by other entities or components. In addition, some embodiments may perform different steps or perform some of the steps in a different order or in parallel.

In the embodiment shown in FIG. 5, the method 500 begins with identifying 510 a first game item for a first player of a location-based game associated with a first client device (e.g., the client device 120A) as being available to trade. For example, the first player may designate one or more game items included in game data for the first player as available to trade. The first client device detects 520 a second client device associated with a second player (e.g., the client device 120B) within a proximity of the first client device. In particular, the first client device receives an identifier of the second player based on a proximity detection of the second client device. For example, the first client may perform a proximity detection of the second client device using the device proximity module 210. The first client device stores 530 the identifier of the second player. For example, the first client device may store the player identifier in the device detection data store 240.

The first client device provides 540 the identifier to an online system hosting the location-based game. For example, the first client device may provide the identifier to the game server 110 (e.g., using the game module 220). In response, the first client device receives 550 game data from the online system indicating an exchange of the first game item for the second game item. For example, the first client device may receive a push notification from the game server 110 indicating the exchange occurred or describing the game item which the first player received.

Figure 6:
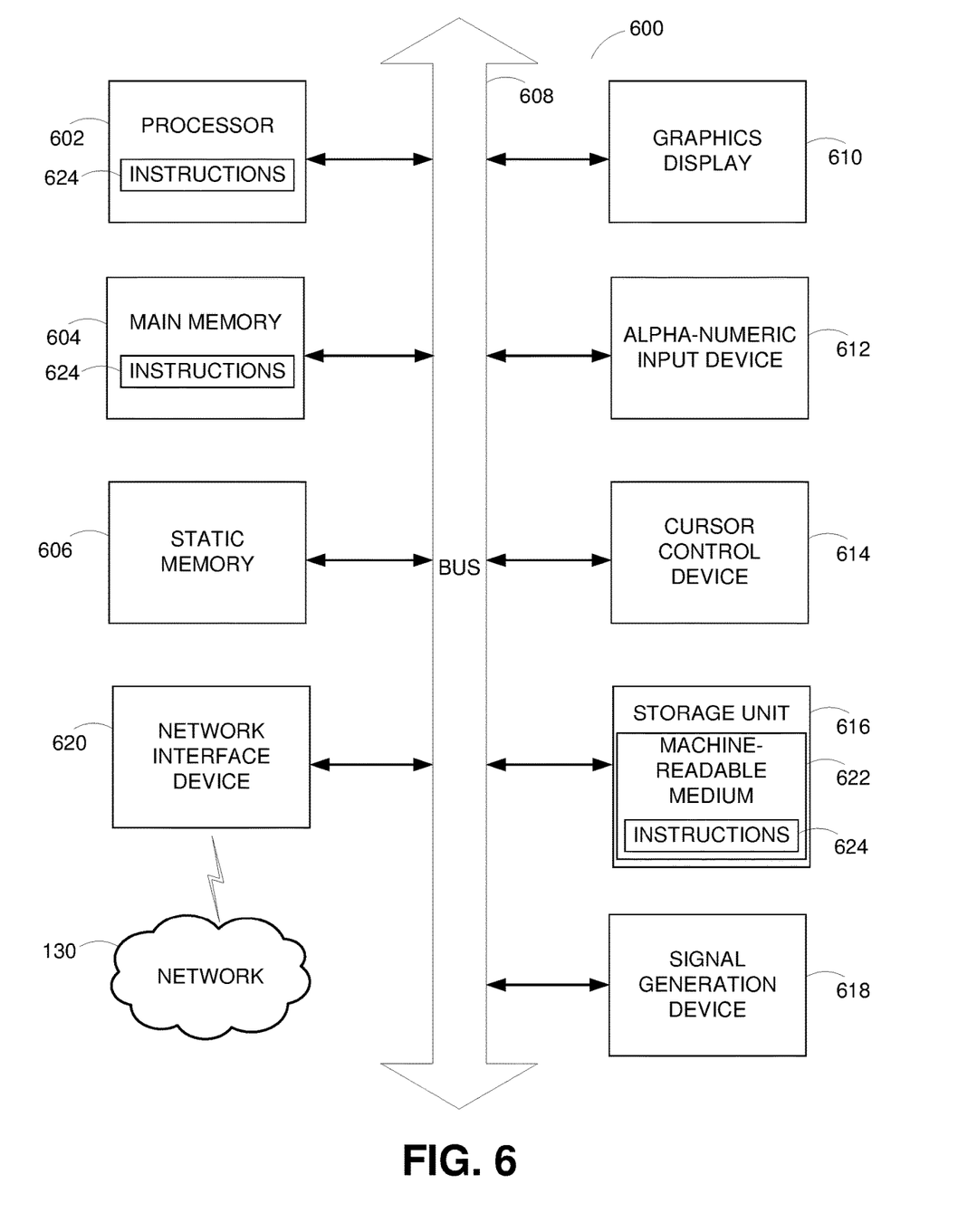
FIG. 6 is a block diagram illustrating an example computer suitable for use in the computing environment of FIG. 1, according to one embodiment.

FIG. 6 is a block diagram illustrating an example computer suitable for use in the network computing environment of FIG. 1, according to one embodiment. Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein, including those associated, and described, with the components (or modules) of a game server 110 or client device 120.

The machine may be a server computer, a client computer, a personal computer (PC), a tablet PC, a set-top box (STB), a smartphone, a network router, switch or bridge, a cell phone tower, or any machine capable of executing instructions 624 (sequential or otherwise) that specify actions to be taken by that machine. Further, while only a single machine is shown, the term "machine" shall also be taken to include any collection of machines that individually or jointly execute instructions 624 to perform any of the disclosed methods.

The example computer system 600 includes one or more processing units (generally one or more processors 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference to a processor 602 may refer to a single processor or multiple processors. The computer system 600 also includes a main memory 604. The computer system may include a storage unit 616. The processor 602, memory 604, and storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 which may store instructions 624 (e.g., software) for performing any of the methods or functions described herein. The instructions 624 may also reside, completely or partially, within the main memory 604 or within the processor 602 (e.g., within a processor's cache memory) during execution by the computer system 600. The main memory 604 and the processor 602 also constitute machine-readable media. The instructions 624 may be transmitted or received over a network 130 via the network interface device 620.

While the machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methods or functions disclosed herein. The term "machine-readable medium" includes, but is not limited to, data repositories in the form of solid-state memories, optical media, and magnetic media.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method for exchanging virtual game items in a parallel reality game, the method comprising:
    identifying, by a game server, a first game item associated with a first player of the parallel reality game as available to trade, wherein the parallel reality game includes a virtual world whose virtual geographic locations parallel geographic locations in a real world, and wherein the first game item is a first virtual game item that exists in the virtual world of the parallel reality game;

receiving, by the game server and from a first client device, an indication that the first client device has detected, by scanning for a signal in the real world, a second client device within a proximity of the first client device, the second client device associated with a second player of the parallel reality game, wherein the second player has a second game item available to trade, the second game item being a second virtual game item that exists in the virtual world of the parallel reality game;

receiving, by the game server and from the first client device, an identifier of the second player as first device proximity detection information, the identifier of the second player being stored by the first client device in response to the scanning;

determining, by the game server and in response to receiving the first device proximity detection information, whether an identifier of the first player has been received by the game server from the second client device as second device proximity detection information; and in response to determining receipt of the first and second device proximity detection information, transmitting, by the game server, game data of the virtual world indicating an exchange of the first virtual game item for the second virtual game item.

2. The method of claim 1, further comprising:
causing, by the game server, the first client device to display a notification on a screen of the first client device describing the exchange.

3. The method of claim 1, wherein the first client device detects the second client device by scanning a local network and wherein the identifier of the second player is received by the first client device over the local network.

4. The method of claim 1, wherein the first client device detects the second client device by scanning a personal area network and wherein the identifier of the second player is received by the first client device over the personal area network.

5. The method of claim 1, wherein identifying the first game item as available to trade comprises:
receiving, by the first client device, a selection of one or more game items associated with the first player, the one or more game items including the first game item; and
receiving, by the game server, the selection of the one or more game items for inclusion in a list of items associated with the first player that are available to trade with other players.

6. The method of claim 1, wherein the second client device is detected while the first client device does not have connectivity to the game server, and wherein receiving, by the game server and from the first client device, the identifier of the second player comprises, the first client device:
detecting that the first client device has connectivity to the game server via a network; and
transmitting the identifier of the second client device to the game server via the network.

7. The method of claim 6, further comprising, the first client device:
comparing the identifier of the second player to one or more previously stored player identifiers, the one or more previously stored player identifiers associated with corresponding time stamps indicating when the one or more player identifiers were stored on the first client device; and
responsive to determining the identifier of the second player was not previously stored on the first client device within a time interval, storing the identifier with a current time stamp.

8. The method of claim 1, wherein the parallel reality game is an interactive, location-based game.

9. A non-transitory computer-readable storage medium storing instructions that, when executed by a first client device, cause the first client device to perform operations comprising:
scanning, by the first client device and in a real world, a personal area network for other client devices, each of the first client device and the other client devices having installed thereon a parallel reality game application that includes a virtual world whose virtual geographic locations parallel geographic locations in the real world;
receiving, based on the scanning, an identifier from a second client device via the personal area network, the identifier associated with the parallel reality game application installed on the second client device;
storing, by the first client device, the identifier associated with the second client device;
providing the identifier to a game server hosting the parallel reality game application as first device proximity detection information; and
receiving, from the game server and in response to the game server determining that a second identifier associated with the first client device has been received by the game server from the second client device as second device proximity detection information, data describing an action performed by the game server relating to the parallel reality game application, wherein the action is based on the identifier associated with the second client device and is performed in the virtual world based on geographic locations of the first and second client devices in the real world.

10. The computer-readable storage medium of claim 9, wherein the parallel reality game application is an interactive, location-based game application.

11. The computer-readable storage medium of claim 10, wherein the first client device is associated with a player account of the location-based game application, and the data describes a virtual game item for the player account, game progress for the player account, a game feature for the player account, or information describing one or more other player accounts game activity.

12. The computer-readable storage medium of claim 9, wherein scanning the personal area network comprises:
sharing the second identifier associated with the first client device over the personal area network, the second identifier identifiable by the other client devices connected to the personal area network.

13. The computer-readable storage medium of claim 9, wherein the identifier is received while the first client device does not have connectivity to the game server, and providing the identifier associated with the second client device comprises:
detecting that the first client device has connectivity to the game server via a network; and
providing the identifier to the game server responsive to the first client device having connectivity.

14. The computer-readable storage medium of claim 9, wherein scanning the personal area network comprises:

initiating the scanning in response to an interaction by a user of the first client device.

15. The computer-readable storage medium of claim 9, wherein the personal area network is a Bluetooth Low Energy network.

16. The computer-readable storage medium of claim 9, further comprising:
displaying, by the first client device, a notification describing the receiving of the identifier of the second client device.

17. An online system comprising:
a database storing game data for a parallel reality game, the parallel reality game including a virtual world whose virtual geographic locations parallel geographic locations in a real world, and the game data comprising data of the virtual world and a plurality of game items, each game item being a virtual game item that exists in the virtual world of the parallel reality game; and
a game action module configured to perform operations comprising:
identifying a first virtual game item of the plurality of game items, the first virtual game item being associated with a first player of the parallel reality game as available to trade;
identifying a second virtual game item of the plurality of game items, the second virtual game item being associated with a second player of the parallel reality game as available to trade; p2 receiving, in response to a first client device associated with the first player scanning for a signal from other client devices, an identifier of the second player as first device proximity detection information, the identifier indicative that the first client device was within proximity in the real world of a second client device associated with the second player;
determining, in response to receiving the first device proximity detection information, whether an identifier of the first player has been received from the second client device as second device proximity detection information;
updating, based on the received first and second device proximity detection information, the game data to reflect an exchange of the first and second virtual game items in the virtual world, the exchange resulting in the first virtual game item being associated with the second player in the virtual world of the parallel reality game and the second virtual game item being associated with the first player in the virtual world of the parallel reality game; and
providing the updated game data to the first client device.

18. The system of claim 17, wherein identifying the first virtual game item as available to trade comprises:
receiving a selection of one or more game items associated with the first player from the first client device, the one or more game items including the first virtual game item; and
assigning the one or more game items to a list of items associated with the first player that are available to trade with other players.

19. The system of claim 17, wherein updating the game data to reflect the exchange of the first and second virtual game items comprises:
identifying a first value of the first virtual game item and a second value of the second virtual game item; and
responsive to a difference between the first value and the second value being within a threshold, updating the game data to reflect the exchange.

20. The system of claim 17, wherein the first client device detects the second client device by scanning a personal area network and wherein the first client device receives the identifier of the second client device via the personal area network while the second client device was in proximity to the first client device.

* * * * *

UNITED STATES PATENT AND TRADEMARK OFFICE
CERTIFICATE OF CORRECTION

PATENT NO. : 11,701,593 B2
APPLICATION NO. : 16/902150
DATED : July 18, 2023
INVENTOR(S) : Gordon Paul Jeffery, III It is certified that error appears in the above-identified patent and that said Letters Patent is hereby corrected as shown below:

In the Claims

In Column 17, in Claim 17, Line 29, after "trade;" delete "p2".

Signed and Sealed this
First Day of October, 2024

Katherine Kelly Vidal
*Director of the United States Patent and Trademark Office*